Feb. 13, 1923.
W. G. DINGLE
METHOD OF AND MEANS FOR PRODUCING PURE LIQUID HYDROCYANIC ACID
Filed Apr. 19, 1919
1,445,303
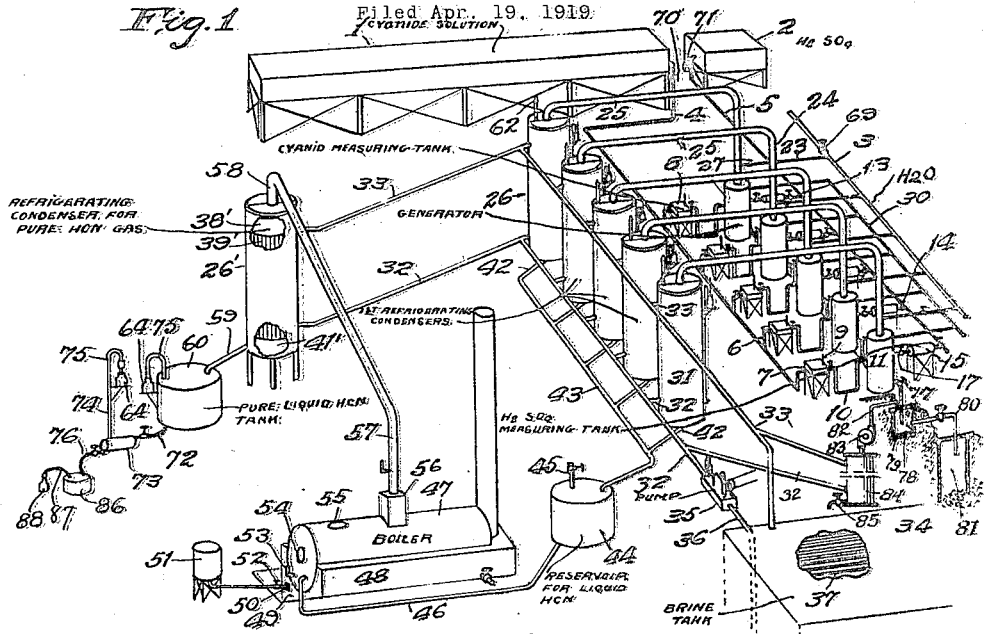
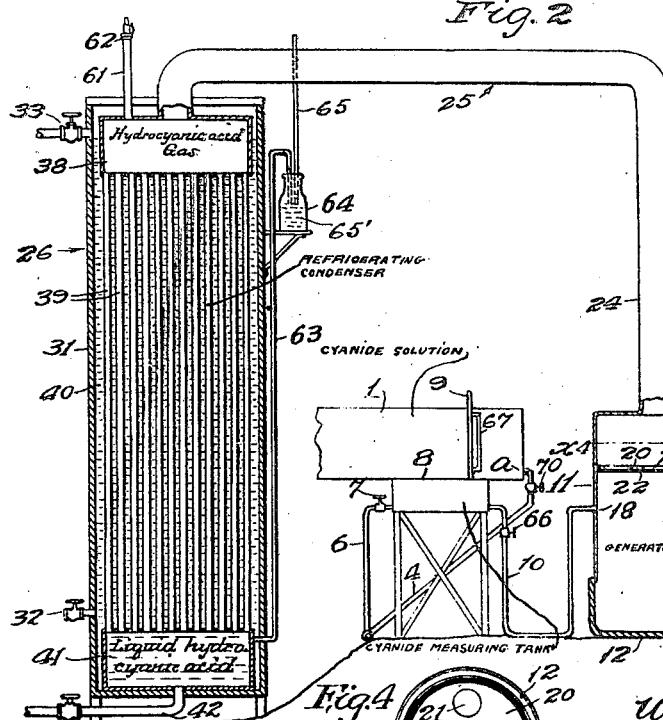

Patented Feb. 13, 1923.

1,445,303

UNITED STATES PATENT OFFICE.

WILLIAM G. DINGLE, OF LOS ANGELES, CALIFORNIA.

METHOD OF AND MEANS FOR PRODUCING PURE LIQUID HYDROCYANIC ACID.

Application filed April 19, 1919. Serial No. 291,183.

*To all whom it may concern:*

Be it known that I, WILLIAM G. DINGLE, a citizen of the United States, residing at Los Angeles, in the county of Los Angeles and State of California, have invented and discovered a new and useful Method of and Means for Producing Pure Liquid Hydrocyanic Acid, of which the following is a specification.

One object of the invention is to provide from cheap materials in large quantities a comparatively inexpensive chemically pure liquid hydrocyanic acid especially adapted for the purpose of fumigating citrus trees, for the destruction of pests in general, and in fact, to make available to the arts for general purposes large quantities of chemically pure liquid hydrocyanic acid at a comparatively low cost.

The principal object of the invention, however, is the provision of a medium especially adapted for the fumigation of citrus trees in forms that will avoid injuring the tender portions of said trees, while insuring more effectually than has been heretofore possible the certain destruction of the pests which infest said trees.

As is well known, it has been heretofore customary to produce hydrocyanic acid from potassium cyanide, sulphuric acid and water or from sodium cyanide, sulphuric acid and water. But, it is further well known that the product of this procedure invariably contains a diluent such as water, chlorine gas, hydrogen gas, and sometimes sulphuric acid, all of which are detrimental to the use of the resulting gas for fumigating purposes. Other objections exist when such gas is employed for spraying orange trees, that it is not necessary to mention herein. In carrying out this invention, on the other hand, I produce a crude hydrocyanic acid gas from any suitable materials including sodium cyanide, sulphuric acid and water, or potassium cyanide, sulphuric acid and water, and by refrigerating said gas to convert it into a liquid form, then heating said gas within a range of from say 80° to 180° F. to regasify the same, I eliminate from the gas a very large percentage of its impurities so that when I again refrigerate the gas and regasify the same, in use, it is found to be substantially chemically pure, all as will appear more fully hereinafter.

In connection with this mode of procedure I have also produced an apparatus which I believe to be radically new.

In my copending application Sr. No. 167,118, filed May 5, 1917, now U. S. Letters Patent #1,304,745 dated May 27, 1919, and entitled Method and apparatus for producing liquid hydrocyanic acid, I have disclosed an apparatus adapted for use in the production of crude or impure liquid hydrocyanic acid, and no claim is made herein to any specific method of producing the crude liquid hydrocyanic acid which is subjected to the purifying steps of this invention.

Referring to the accompanying drawings forming a part of this specification:

Figure 1 is a diagrammatic perspective view of a plant adapted to produce from appropriate chemicals the pure liquid hydrocyanic acid ready for delivery to the consumer.

Fig. 2 is an elevational view partly in section of a portion of the plant shown in Fig. 1.

Fig. 3 is an enlarged fragmental sectional view of one of the generator chambers shown in Figs. 1 and 2.

Fig. 4 is a cross sectional view of the generator chamber taken on line $x4-x4$ of Figs. 2 and 3, looking down.

1 is the cyanide solution tank, 2 the sulphuric acid tank and 3 the water supply pipe from which the chemicals and the water for producing crude hydrocyanic acid gas are supplied to the generators. 4 is the cyanide solution main leading from tank 1 and 5 the sulphuric acid pipe line leading from tank 2. The cyanide solution is supplied from the main 4 through supply pipes 6 having valves 7, to the solution-measuring tanks 8 having ventilators 9 and connected by the valved U-shaped traps 10 to the lead-lined generating chambers 11, each chamber having its bottom formed of a cast lead bowl 12.

The sulphuric acid main 5, which is a lead-lined iron pipe, is connected through the lead-lined supply pipes 13 having valves 14, to the sulphuric acid measuring tanks 15 having ventilators 16. Said acid measuring tanks 15 are connected by valved pipes 17 with the generator chambers 11 at about the same level as the U-traps 10, as best shown in Figure 2.

The solution and acid inlets 18 and 19 into the generating chambers 11 are preferably below the level of the inlets $a$, $b$, to the mains 4 and 5 so that the liquids flow by gravity to the said chambers where they fall to the bottom to unite with each other and with the water from the water line 3.

Each generator chamber 11 is provided above the level of the solution and acid inlets 18 and 19, with a baffle plate 20 which is provided with passages 21 in the form of large holes to allow the gases and vapors evolved to pass upward and to prevent too rapid outflow of the products of the reactions which take place at the bottom of the generator. Said baffle plate is made of heavy boiler steel, having a lead facing 22 on the under side.

The water line 3 is connected by branches 23 with the vertical ascending limb 24 of a bent gas pipe 25 which leads from the closed top of the generator chamber 11 to the primary or crude refrigerating condenser 26. The branches 23 are provided with valves 27 to shut off the flow of water supplied to the generator.

The generating plant may be constituted of any desired number of units, each unit comprising a solution measuring tank 8, an acid measuring tank 15, a generator chamber 11, and a refrigerating condenser 26 with the connections above described. In the drawing, the plant is shown provided with five units. The generating chamber 11 is also provided with a compressed air agitating blow-off pressure pipe 28 having a valve 29 and connected with the compressed air line 30.

The first refrigerating condensers 26 comprise tanks 31 open at the top and are provided with valved inlet and outlet refrigerating brine pipes 32 and 33, which communicate with the brine tank 34. The cold brine supply pipe 32 is connected with a pump 35 which draws the supply of brine through a suction pipe 36 and forces it up through the first condenser tanks 31 to the level of the pipes 33 through which it flows back to the tank 34. The brine preferably used is a well-known refrigerant such as calcium chloride solution. The brine tank 34 is provided with refrigerating ammonia pipes 37 connected with a refrigerating plant, not shown, to conduct the heat from the calcium chloride brine.

The primary refrigerators or condensers 26 are of a common construction and are each provided with a gas receiving chamber 38 inside the tank 31 into which the gas pipe 25 discharges.

Each receiving chamber 38 is connected with refrigerating pipes 39 that pass down through the upwardly flowing calcium chloride solution 40 contained in the tank, and discharge into the liquid crude hydrocyanic acid collector 41 at the bottom of the condenser.

Said collector 41 is connected with a valved draw-off pipe 42 which leads to a collecting pipe 43 that discharges into the reservoir 44 which is closed except at the inlet and the outlet, and at a valved vent 45. Said reservoir 44 is connected through its outlet with a boiler supply pipe 46 by which it is connected with an insulated heater or boiler 47 set in masonry 48 and provided with a fire box 49 having a burner 50 supplied from an oil tank 51 with fluid fuel controlled by a valve 52, so that a continuous fire of regulable character can be maintained under the boiler to heat the contents thereof.

The boiler is provided with a thermometer 53 by which the temperature of the contents of the boiler may be ascertained and the said boiler is also provided with a sight glass 54 and with a light glass 55, so that the contents of the boiler may be kept under a constant supervision as to the amount of ebullition.

The boiler is provided at the top with a dome 56 from which the bent pure gas pipe 57 extends upwardly and then over and downwardly to form a limb 58 which discharges into the pure gas collector 38' of the second refrigerating condenser 26', the interior construction of which corresponds to that of the first refrigerating condensers 26. The refrigerating pipes 39' cause the gas to condense and flow down into the pure hydrocyanic acid collector 41'.

In the plant illustrated, one boiler with one second condenser is shown as being connected to receive the product from a set of five gas generating units. The collector 41' of the second condenser 26' discharges through discharge pipe 59 into the pure liquid hydrocyanic acid tank 60.

All of the containers, such as tanks, pipes, reservoirs, boilers and collectors, through or out of which the hydrocyanic acid gas or the cyanide passes, are closed to the open air, except as to suitable vents, such as the vents 9, 16 and 61, each of which may be provided with safety valve means as at 62 to control the automatic venting which may occur when the gas in the condenser becomes pent up. Such safety valve means are usually set to operate at about 10 pounds pressure.

It is found in actual practice that gaseous products foreign to pure liquid hydrocyanic acid are apt to become manifest in the hydrocyanic acid liquid collector tank 41, and for this reason a vent pipe 63 leads from the upper part of the liquid collector tank 41 and extends up to near the top of the refrigerating condenser 26 where it is bent over and inserted into a clear glass wash bottle 64 into which the vent pipe 63 leads. Said wash bottle 64 is provided with an escape pipe 65 and with a charge 65' of a 10% solution of caustic soda for the purpose of absorbing the hydrocyanic acid.

The hydrocyanic acid is absorbed by the caustic soda while the hydrogen and other gases that may arise by reactions of the chemicals and the materials of the containers, may pass out through the vent pipe 65. From time to time, the contents of the caustic soda bottle is emptied into the cyanide solution tank 1 to recover any cyanide collected by the caustic soda.

In practice the operator will manipulate the valves 7 and 14 to measure out for any unit, the required charges of sulphuric acid and cyanide solution in the measurement tanks 8 and 15, the valves 66 and 17 being closed when the appropriate charges are supplied.

The bottom of the supply tanks 1 and 2 are level with the top of the measuring tanks 8 and 15, and the vent pipes 9 and 16 extend up to the level of the top of the supply tanks 1 and 2, so that the liquid may be supplied from said supply tanks to the measuring tanks through the gravity supply pipes 4 and 5 without flowing out of the vent pipes.

When the operator wishes to charge a generator with the chemicals for producing a gas which is to be liquefied he will close valved pipe 17 and valve 66 and will then open valves 7 and 14; whereupon the cyanide solution and the sulphuric acid will flow into their respective measuring tanks 8 and 15.

The operator will note through the glasses 67 and 68 when the measuring tanks are full. The operator will then open the valve 27 and allow water to flow into the generator and will then open the valves 17 and 66, thus allowing the cyanide solution and the sulphuric acid to flow into the water in the bottom of the generator tank. Chemical reaction immediately takes place producing hydrocyanic acid gas which flows through the pipe 24 into the refrigerating condenser.

The vents 9 and 16 are provided with liquid level glasses 67 and 68 respectively, by means of which the height of the liquid levels in the said vents may be ascertained, when the valves 7 and 14 are open, and the valve 66 and valved pipe 17 are closed.

The pipes 3, 4 and 5 are provided with supply regulating valves 69, 70 and 71 respectively by means of which the supply may be cut off or turned on at will.

In practice when the operator desires to produce crude hydrocyanic acid he will first close the valve at 66 and pipe 17 and then will open the valves 69, 70 and 71, and the valves 7 and 14 respectively. Thereupon the measuring tanks 8 and 15 will be filled with cyanide solution and sulphuric acid respectively, the air vents 9 and 16 allowing this to take place readily. The operator by inspecting the liquid level glasses 67 and 68 will be able to determine when the tanks 8 and 15 have been filled, and will thereupon shut the valves 7 and 14. He will then open the valves 27, 66 and 17 thus allowing an influx of water, cyanide solution and sulphuric acid into the generator 11. The water admitted from the pipe 23 into the upright ascending limb 24 of the bent pipe 25 will drop down said ascending limb onto and through the baffle plate 20 and into the lower part of the generator. The generation of crude hydrocyanic acid gas thereupon commences and the products of such generation rise through the pipes 24, 25 and flow into the collector 38 and on down through the pipes 39 which are surrounded by the refrigerating medium 40 by which the temperature of the gas is brought below 80° F. In consequence of the lowering of the temperature of the gas, said gas condenses to a liquid which is collected in the collector 41 and is drawn off through the pipe 42 to the crude liquid cyanide whence it flows through the pipe 46 into the lower part of the boiler 47. Heat being applied to the boiler 47 the hydrocyanic acid is gasified and flows off from the dome 56 through the gas pipe 57 and into the collector 38' thence down through the pipes 39 where it is condensed and falls into the tank 41' from which it is drawn through the pipe 59 into the storage tanks 60 whence it may be discharged to the customer through the valved pipe 72. Said tank 60 is also supplied with a wash bottle 64. The liquid hydrocyanic acid measuring tank 73 is provided with a vent pipe 74 curved at 75 and also having a wash bottle 64. The valved pipe 76 leads from the tank 73, into any suitable final collecting vessel as indicated. The generators 11 are provided with valved pipes 77 to carry away the residue which accumulates at the bottom of the generators, and in Fig. 1, one of said pipes 77 and a line pipe 78 leading from the other generators are shown discharging into a lead lined tank 79 that is buried in the ground and from which a valved pipe 80 leads into a bottomless lead lined pipe 81 into which the final discharge of waste residue is effected. Gases arise from the residue deposited in the tank 79 and are thrown off through a pipe 82 by means of a power driven fan 83 into a condenser 84 that is connected with the cooling pipes 32 and 33. The condensation from the condenser 84 may be drawn off through the valve 85 and may be passed on to the tank 44 for further treatment, the same as with the liquid which passes through the pipe 43. In actual practice I prefer to carry on the condensation of the crude hydrocyanic acid gas, as it first comes from the generator 11, at a temperature of say from 18° to 40° F. for I have found by actual experience that when the said initial condensation is carried on at a temperature only slightly below the liquefying point, owing to various impurities, such as carbon, which are present in the raw materials, an objectionable substance closely resembling lampblack is deposited upon the walls of the refrigeration apparatus. This deposit soon clogs the various parts of the apparatus, causing great inconvenience and resulting in a somewhat inferior product from the final distillation. On the other hand, if the initial condensation is carried out at a temperature of say from 18° to 40° F. I have found that this said deposit does not occur and that a better final product results.

After the crude gas has been liquefied as just indicated, it is passed to the boiler, where its temperature is raised by the means above disclosed to from say 90° to 170° F. which again gasifies the acid. The boiling point of the acid being approximately 80° F. is much lower than the boiling points of the impurities resulting from the initial chemical reaction, and therefore, these said impurities are left behind in the boiler 47.

It sometimes happens that hydrocyanic acid is required which contains more or less of some of the impurities, such for example, as water vapor. That is to say, in the fumigation of orchards, for example, on certain kinds of trees the pests infest the lower parts of the tree more than the upper parts, while on the other trees the conditions are exactly reversed. Where the organisms are more numerous near the top of the tree, a light gas which will rise readily to the top is desirable.

When a heavy gas is required I carry on the heating of the crude liquid hydrocyanic acid in the boiler 47, at a temperature only slightly above its boiling point, or say from 90° to 120° F. at which temperatures substantially none of the impurities will be vaporized and a final liquid acid having a purity of from 96 to 98% will be obtained. Such a liquid acid will produce a relatively heavy fumigating gas which will readily fall to the lower portions of the trees.

On the other hand, if the trees to be treated are infested upon their upper portions, a somewhat lighter gas which will rise rapidly is preferable. To this end, if the temperature in the boiler 47 is raised to say from 140° to 170° F. a vapor will arise from the water present in the said boiler, and will pass over with the hydrocyanic acid gas. This vapor will be condensed in the final refrigeration and owing to the great affinity of the said acid for water, will somewhat dilute the acid, yielding a product having a purity of from say 90 to 96%, depending upon the exact temperature used in the boiler. Such a liquid will produce a fumigating gas which is somewhat lighter than that first mentioned above, and which will be better adapted for the treatment of trees the upper portions of which are more infected.

In other words, the density of the fumigating gas can be readily controlled by the variation of the temperature in the boiler 47, the closer the temperature is held to the boiling point of the crude acid the heavier will be the final product, while the lower the temperature in the boiler, up to say 170° F. the heavier will be the final product.

The final condensation of the hydrocyanic acid gas after its coming from the boiler 47 may be carried on at any desired temperature below the boiling point, say 80° F. However, the lower the temperature at which this final condensation is carried out, the more stable will be the resulting liquid acid, and the temperature which is used in this final step will depend to a great extent upon the final use which is to be made of the product.

By the use of the apparatus and process herein disclosed I have found it possible to produce a liquid hydrocyanic acid having a purity of as high as 98 to 99% from raw materials of a much lower grade than has heretofore been possible. For example, certain grades of sodium cyanide and calcium cyanide now on the market contain relatively large quantities of foreign substances such as uncombined carbon, calcium chloride, etc., and it has not been hertofore commercially practical to utilize such materials for the production of pure hydrocyanic acid. However, by the use of the present process and apparatus, such materials may be used with great success.

I claim:—

1. The method of making substantially pure liquid hydrocyanic acid from materials containing impurities which consists in producing a gas containing hydrocyanic acid and gaseous impurities by a chemical reaction between said materials; subjecting said gas to a temperature of from 18° F. to 40° F. to liquefy said hydrocyanic acid and a portion of said impurities, thereby separating them from such of the other impurities as are less easily liquefied; heating said liquid to a temperature below 120° F. to again gasify said acid without gasifying substantially any of the liquefied impurities; and collecting said gaseous acid and subjecting it to a temperature below 80° F. to again liquefy the same, substantially as described.

2. The means set forth for producing liquid hydrocyanic acid which comprises a hydrocyanic acid gas generator; a pipe leading therefrom; a refrigerating condenser connected to receive gas from said pipe and to liquefy the same; a boiler; means to deliver the liquid hydrocyanic acid from said condenser to the boiler in regulated charges; means to apply heat to the boiler; a second refrigerating condenser; means to conduct gas from the boiler to the second condenser; and means adapted to receive liquefied acid from said second condenser and to maintain the same at a temperature below the boiling point.

In testimony whereof, I have hereunto set my hand at Washington, D. C., this 19th day of April, 1919.

WILLIAM G. DINGLE.

Witness:
JAMES R. TOWNSEND.